(12) United States Patent
Odagiri

(10) Patent No.: US 6,665,358 B1
(45) Date of Patent: Dec. 16, 2003

(54) DIGITAL MATCHED FILTER CIRCUIT EMPLOYING ANALOG SUMMATION

(75) Inventor: Hideaki Odagiri, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/504,495

(22) Filed: Feb. 16, 2000

(30) Foreign Application Priority Data

Mar. 29, 1999 (JP) .......................................... 11-085928

(51) Int. Cl.[7] .............................................. H04L 27/06
(52) U.S. Cl. ...................... 375/343; 375/149; 375/150; 375/152
(58) Field of Search ................................. 375/343, 364, 375/149, 142, 152; 370/342; 348/697; 342/450

(56) References Cited

U.S. PATENT DOCUMENTS 5,995,046 A * 11/1999 Belcher et al. ............. 342/450
6,301,294 B1 * 10/2001 Hara et al. .................. 375/152

OTHER PUBLICATIONS

"Supekutoramu Kakusan Tsushin" (Spread–Spectrum Communication), Yukiji Yamauchi, Tokyo Electrical University, 1994, pp. 105–112.

* cited by examiner

*Primary Examiner*—Stephen Chin
*Assistant Examiner*—Curtis Odom
(74) *Attorney, Agent, or Firm*—Venable LLP; Michael A. Sartori

(57) ABSTRACT

A digital matched filter stores a series of values of a digital input signal in a memory, compares each stored value with a corresponding value of a known code, and generates an analog comparison result signal for each comparison. The analog comparison result signals are combined to obtain an analog sum signal, which is then converted to a digital output signal. The digital output signal is obtained in real time, because there is little or no processing delay in combining the analog comparison result signals. The circuits that generate and combine the analog comparison result signals are similar to digital circuits, enabling the digital matched filter to be integrated easily with other digital signal-processing circuits.

17 Claims, 9 Drawing Sheets

DIGITAL MATCHED FILTER CIRCUIT EMPLOYING ANALOG SUMMATION

BACKGROUND OF THE INVENTION

The present invention relates to a digital matched filter useful for acquiring synchronization in, for example, a receiver in a code division multiple access communication system.

Code division multiple access (CDMA) is a spread-spectrum communication technique in which a transmitted data signal is spread and despread by a cyclically repeating code, referred to below as a pseudorandom noise code or PN code. To despread a received CDMA signal, the receiver must generate the same PN code as used to spread the signal at the transmitter, in precise synchronization with transmitter's PN code. Before communication can begin, accordingly, the receiver must acquire synchronization with the transmitter's PN code.

To enable synchronization to be acquired, the transmitter commonly transmits a pilot signal or training signal identical to the PN code itself. A fast method of acquiring synchronization employs a matched filter that correlates the received signal with the known waveform of the PN code, or some part thereof.

A PN code can be represented as a series of chips with values of plus or minus one. In this case, a matched filter can be conceptually represented as in FIG. 1 by a tapped delay line 2 with a first set of taps coupled to a first adder 4 and a second set of taps coupled to a second adder 5. A third adder 6 subtracts the sum of the second set of tapped outputs from the sum of the first set of tapped outputs. If the total number of taps is sufficiently large, then the output of the third adder 6 will be very large when the positions of the +1's in the received PN code correspond to the positions of the first set of taps, and the positions of the −1's correspond to the positions of the second set of taps. In other cases, the output of adder 6 will be close to zero. This type of matched filter enables synchronization to be acquired in a period equal, at most, to one complete cycle of the PN code, provided the filter output can be obtained in real time.

To obtain real-time output, the received signal is conventionally supplied as an analog signal to a charge-coupled device (CCD) or a surface-acoustic-wave (SAW) device, which functions as the tapped delay line 2. FIG. 2 shows an equivalent representation of a SAW device in which taps are represented by variable resistances R spaced at delay intervals D equivalent to one chip of the PN code. The tapped outputs are summed in an analog fashion, simply by being coupled in parallel to the same output line.

A disadvantage of using a CCD or SAW device as a matched filter is that the device is a discrete device, which takes up space and cannot easily be integrated with other signal-processing circuitry. This is especially true when the other signal-processing circuitry requires input of the received signal in digital form, as is often the case in CDMA receivers.

SUMMARY OF THE INVENTION

It is accordingly an object of the present invention to provide a method of correlating a digital input signal with a known code in real time.

Another object of the invention is to provide a digital matched filter implementing the invented method.

The invented method stores a series of values of a digital input signal in a memory, compares each stored value with a corresponding value of the known code, and generates an analog comparison result signal for each comparison. The analog comparison result signals are combined to obtain an analog sum signal, which is then converted to a digital output signal.

In one type of digital matched filter implementing the invented method, the analog comparison result signals are current signals generated by switching current sources on and off. The current signals are combined by being supplied in parallel to a common terminal. A current mirror may be used to obtain the analog sum signal by amplifying the combined current signal.

In another type of digital matched filter implementing the invented method, the analog comparison result signals are voltage signals represented by charges stored in capacitors, which are individually charged or discharged according to the comparison results. The analog sum signal is obtained by interconnecting the capacitors, thereby averaging the stored charge.

The invented digital matched filters provide output in real time because the operation of combining the analog comparison result signals into an analog sum signal involves substantially no processing delay.

The circuits that generate and combine the analog comparison result signals have an essentially digital configuration, comprising transistors that are switched on and off, so the invented digital matched filters can easily be integrated with other digital signal-processing circuits.

DETAILED DESCRIPTION OF THE INVENTION

Figure 1:
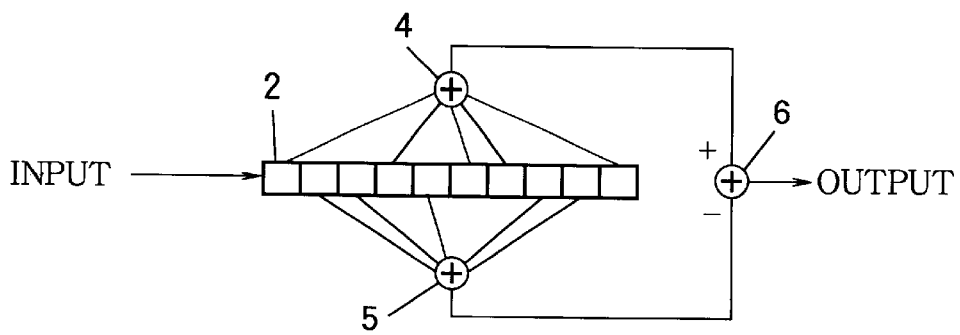
FIG. 1 is a conceptual circuit diagram of a conventional matched filter.
Figure 2:
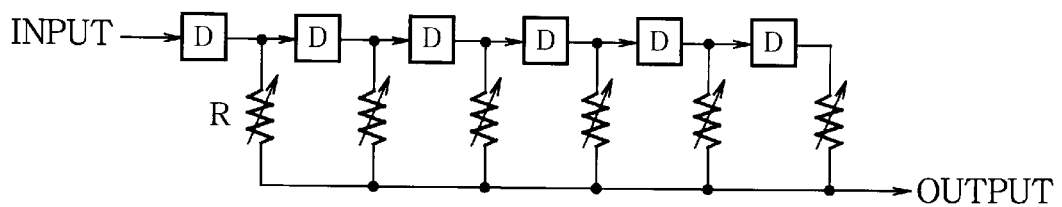
FIG. 2 is an equivalent circuit diagram of a SAW tapped delay line.

Embodiments of the invention will be described with reference to the attached drawings, in which like parts are indicated by like reference characters.

Figure 3:
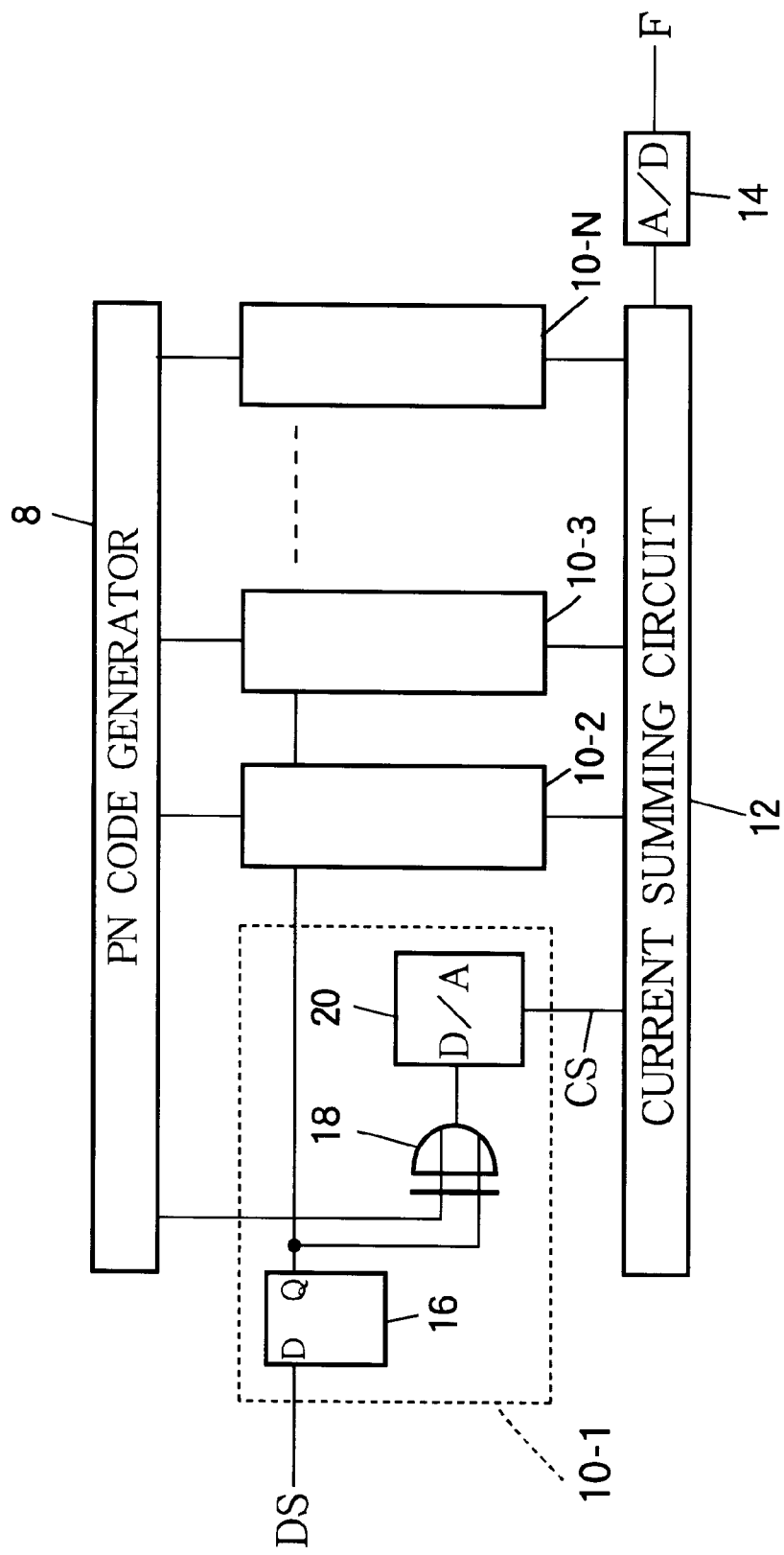
FIG. 3 is a block diagram of a first embodiment of the invention.

Referring to FIG. 3, the first embodiment is a digital matched filter that receives a digitized CDMA baseband signal DS in which each chip is represented by one bit of data. In the following description, the chip values will be represented as zero and one, instead of plus and minus one as mentioned earlier. The zero/one representation is equivalent to the plus/minus-one representation, and is more convenient when the signal is processed by logic circuits, which is the case in the present embodiment.

The first embodiment comprises a PN code generator 8, N unit processing circuits 10 (designated 10-1 to 10-N), a current summing circuit 12, and an analog-to-digital (A/D) converter 14. N is a positive integer.

The PN code generator 8 generates N chips of a PN code and supplies one chip to each unit processing circuit 10. The PN code is generated statically, so that each unit processing circuit 10 receives the same chip value continuously. N is equal to or less than the number of chips in one complete cycle of the PN code. A large value of N has the advantage of yielding a strong and reliable output signal, while a small value of N has the advantage of reduced circuit size. A suitable value of N can be selected by balancing these factors.

Each unit processing circuit 10 comprises a D-type flip-flop 16, an exclusive-NOR gate 18, and a digital-to-analog (D/A) converter 20. The input signal DS is supplied Hi to the data input terminal D of the D-type flip-flop 16 in the first unit processing circuit 10-1. The data output hi terminal Q of each D-type flip-flop 16 is coupled to the data input terminal D of the D-type flip-flop in the next unit processing circuit 10, the D-type flip-flops 16 thus forming a shift register. The D-type flip-flops 16 are clocked by a clock signal (not visible) at the chip rate of the input signal DS.

Figure 4:
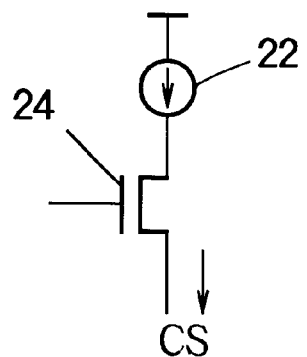
FIG. 4 is a circuit diagram illustrating the digital-to-analog converter in FIG. 3.

The exclusive-NOR gate 18 performs a logical exclusive-NOR operation on the chip value received from the PN code generator 8 and the Q output of the D-type flip-flop 16 in the same unit processing circuit 10, thereby comparing the Q output with the PN code chip. The D/A converter 20 converts the result of this comparison to an analog comparison result signal, more specifically a current signal CS. Referring to FIG. 4, the D/A converter 20 comprises a current source 22 supplying current to the drain terminal of an n-channel metal-oxide-semiconductor (NMOS) transistor 24, the gate terminal of the NMOS transistor 24 being coupled to the output terminal of the exclusive-NOR gate 18 in FIG. 3.

Figure 5:
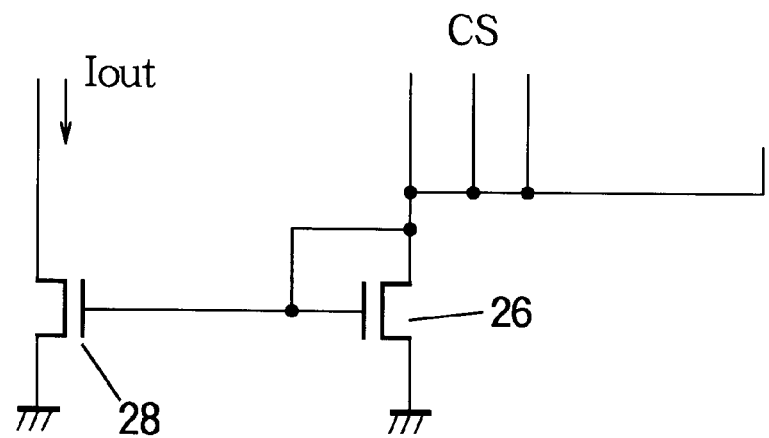
FIG. 5 is a circuit diagram illustrating the current summing circuit in FIG. 3.

The current summing circuit 12 generates an analog sum signal proportional to the sum of the current signals CS received from all of the unit processing circuits 10-1 to 10-N. Referring to FIG. 5, the current summing circuit 12 comprises a pair of NMOS transistors 26, 28 with grounded source terminals and mutually interconnected gate terminals, functioning as a current mirror. The analog comparison result signals CS are supplied in parallel to the drain terminal of transistor 26, this drain terminal also being coupled to the gate terminals of the two transistors 26, 28. The analog sum signal is an output current signal Iout obtained at the drain terminal of transistor 28.

The A/D converter 14 converts the analog output current signal Iout received from the current summing circuit 12 to a digital output signal F representing the output of the digital matched filter. F is, for example, a one-bit signal that is high or low, depending on whether the signal Iout received from the current summing circuit 12 exceeds or does not exceed a predetermined threshold current level.

Next, the operation of the first embodiment will be described.

As each new chip of the input signal DS is received, the chip values stored in the shift register comprising the D-type flip-flops 16 shift to the right. The exclusive-NOR gates 18 compare the stored chip values with the corresponding chip values received from the PN code generator 8. When the input signal DS is not synchronized with the PN code generated by the PN code generator 8, the compared values match in substantially half of the chips, so the outputs of substantially half of the exclusive-NOR gates 18 are high, the outputs of the rest of the exclusive-NOR gates 18 being low. The switching transistors 24 in substantially half of the D/A converters 20 therefore switch on, supplying respective units of current to the current summing circuit 12. The current summing circuit 12 generates an output current Iout proportional to the sum of these substantially N/2 unit currents. The constant of proportionality depends on the relative sizes of the transistors 26, 28 forming the current mirror. The A/D converter 14 converts this current output Iout to, for example, a low logic level of the digital output signal F.

When the input signal DS is in synchronization with the PN code generated by the PN code generator 8, all of the chip values stored in the D-type flip-flops 16 match the chip values output by the PN code generator 8, so the outputs of all of the exclusive-NOR gates 18 go high, switching on the transistors 24 in all of the D/A converters 20. The current summing circuit 12 now receives current from all of the unit processing circuits 10-1 to 10-N, and generates an output current Iout proportional to the sum of N unit currents. The A/D converter 14 converts this current Iout to, for example, a high logic level of the digital output signal F.

The operations described above are transistor switching operations and other simple operations that take place rapidly. In particular, the summation of the currents received from the unit processing circuits 10-1 to 10-N takes place quickly, requiring only enough time to charge the gate capacitance of transistor 28 to a new potential level. Output is therefore obtainable in real time.

The D/A converters 20 and current summing circuit 12 have a simple structure, enabling the first embodiment to be integrated easily with other digital circuits (not visible), such as circuits for despreading and otherwise processing the input signal DS after synchronization has been achieved. A CDMA receiver employing the first embodiment, instead of a conventional CCD or SAW device, can therefore have a reduced parts count, a smaller size, and a lower cost.

In a variation of the first embodiment, the A/D converter 14 generates a multiple-bit output signal F indicating the magnitude of the output current Iout, thereby indicating the degree of correlation between the received signal DS and the PN code. This variation enables the digital matched filter to be used as a correlator after synchronization is achieved, the PN code generator 8 being switched from static to dynamic operation to maintain synchronization after synchronization is recognized.

In another variation, the output current Iout is converted to an analog voltage signal for input to the A/D converter 14.

In another variation, the D-type flip-flops 16 are replaced by another type of memory circuit for storing the input signal DS. Random-access memory (RAM) or data latches other than D-type flip-flops can be used, for example.

Next, a second embodiment will be described. The digital input signal in the second embodiment is a multiple-bit signal.

Figure 6:
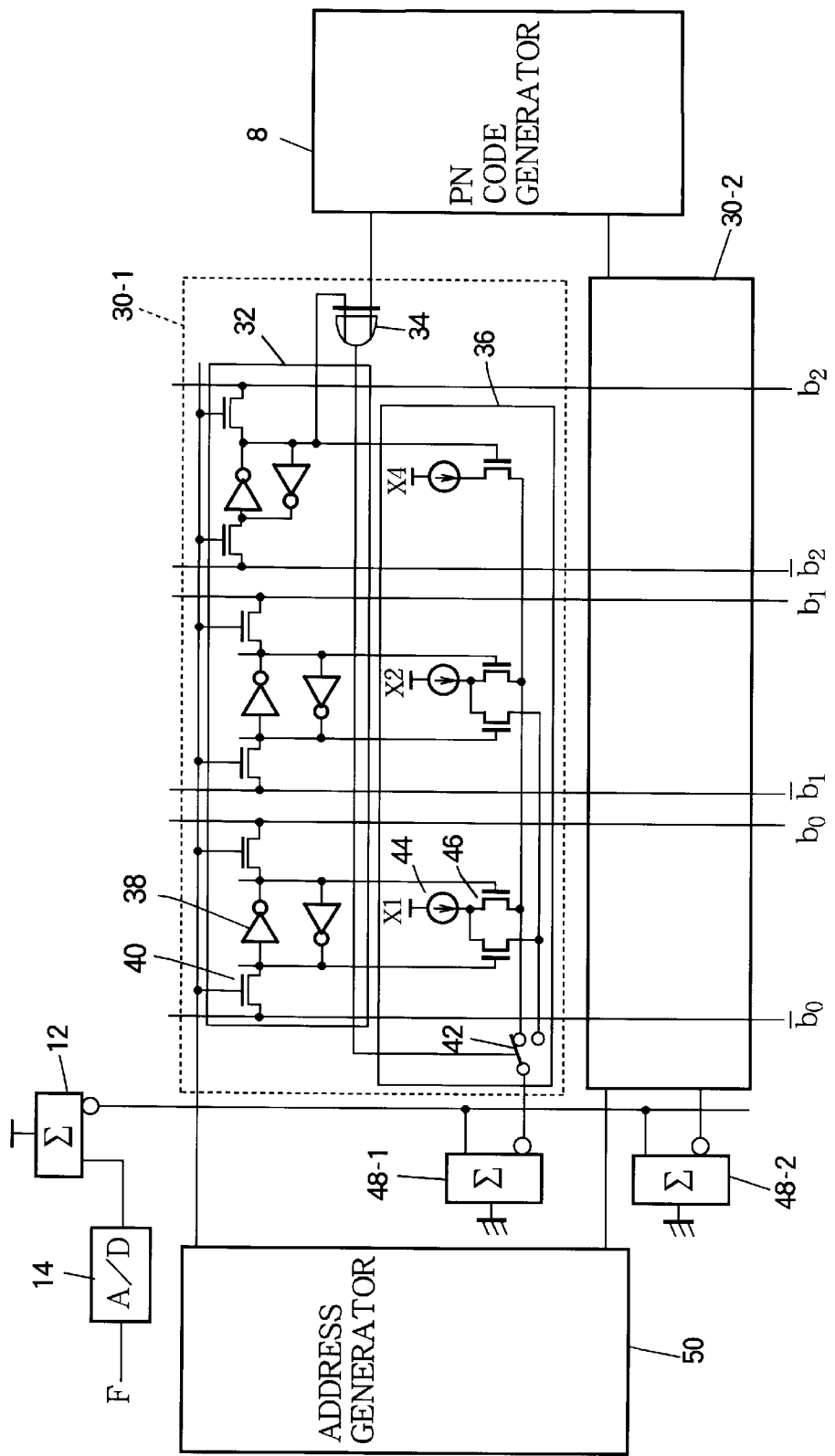
FIG. 6 is a circuit diagram illustrating a second embodiment of the invention.

Referring to FIG. 6, the PN code generator 8 in the second embodiment generates one complete cycle of the PN code. The PN code generator 8 is coupled to a plurality of unit processing circuits 30 (designated 30-1, 30-2, . . . ), furnishing one chip value of the PN code to each unit processing circuit 30. Each unit processing circuit 30 comprises a memory circuit 32, an exclusive-OR gate 34, and a digital-to-analog converter 36.

The memory circuit 32 comprises a number of static memory cells equal to the number of bits per chip of the digital input signal DS. In the following description, DS is a three-bit signal, and the memory circuit 32 has three memory cells, each comprising a pair of inverters 38 and a pair of transistors 40. The two inverters 38 are coupled in ring fashion, forming a bi-stable circuit. The transistors 40 couple the inverters 38 to a pair of complementary data input lines. The three bits of input data are denoted $b_2$, $b_1$, $b_0$, the most significant bit ($b_2$) being the sign bit, the other two bits ($b_1$, $b_0$) being amplitude bits. Overbars are used to denote complementary bit values.

The exclusive-OR gate 34 has one input terminal that receives the sign bit $b_2$ stored in the memory circuit 32, and another input terminal that receives the chip value output by the PN code generator 8. The output of the exclusive-OR gate 34 controls a switch 42 in the digital-to-analog converter 36.

The digital-to-analog converter 36 has a number of current sources 44 equal to the number of bits of the input signal DS, weighted to correspond to the bit weights of the input signal. The current source 44 corresponding to the least significant bit $b_0$ generates one unit of current, as indicated by the symbol X1 in the drawing. The current source corresponding to bit $b_1$ generates two units of current, as indicated by the symbol X2. The current source corresponding to the sign bit $b_2$ generates four units of current, as indicated by the symbol X4.

The X1 current source 44 is coupled to the drain terminals of a pair of NMOS transistors 46. The gate terminals of these NMOS transistors 46 receive complementary output signals from the memory cell storing the least significant bit $b_0$ in the memory circuit 32. The source terminals of these two NMOS transistors 46 are coupled to the two input terminals of the switch 42. The upper input terminal of switch 42 receives one unit of current from the X1 current source 44 when bit $b_0$ is high ('1'). The lower input terminal of switch 42 receives one unit of current from the X1 current source 44 when bit $b_0$ is low ('0').

The X2 current source is coupled to the drain terminals of a similar pair of NMOS transistors, the gate terminals of which receive complementary output signals from the memory cell storing bit $b_1$. The source terminals of these NMOS transistors are also coupled to the two input terminals of the switch 42, the upper input terminal receiving two units of current from the X2 current source when bit $b_1$ is high, the lower input terminal receiving two units of current from the X2 current source when bit $b_1$ is low.

The X4 current source is coupled directly to the upper input terminal of switch 42, which always receives four units of current from this current source.

All of the unit processing circuits 30 have the same internal structure, and are coupled in parallel to the same data input lines.

The second embodiment has a current summing ($\Sigma$) circuit 12 and an analog-to-digital (A/D) converter 14 as described in the first embodiment. In addition, the second embodiment has a plurality of current-summing circuits 48 (designated 48-1, 48-2, . . . ) that amplify the currents received from the unit processing circuits 30. Each of these current-summing circuits 48 has, for example, the current-mirror configuration shown in FIG. 5. Current summing circuit 12 sums the output currents generated by current-summing circuits 48-1, 48-2, . . . .

The second embodiment also has an address generator 50 coupled to the gate terminals of the transistors 40 in the memory circuits 32. The address generator 50 addresses the memory circuits 32 one by one by switching on their transistors 40.

Next, the operation of the second embodiment will be described.

When the first chip of the input signal DS is received, the address generator 50 switches the transistors 40 in the first unit processing circuit 30-1 on, then off. The three bits $b_2$, $b_1$, $b_0$ of data representing the first chip are thereby stored in the memory circuit 32 in the first unit processing circuit 30-1. When the next chip of the input signal DS is received, the address generator 50 switches the transistors 40 in the second unit processing circuit 30-2 on, then off, storing this chip in the memory circuit 32 of the second unit processing circuit 30-2. Subsequent chips are stored in the following unit processing circuits 30 (not visible) in the same way. Since the number of unit processing circuits 30 is equal to the length of the PN code, when DS chips have been stored in all of the unit processing circuits 30, the next chip is stored in the first unit processing circuit 30-1 again, the memory circuits 32 thus being used as a ring buffer.

The PN code generator 8 supplies each unit processing circuit 30 with a separate chip of the PN code. The PN code generator 8 operates dynamically, shifting the PN code forward by one position as each new chip of the input signal DS is received, so that the alignment between the PN code and the stored input signal DS changes once per chip.

Figure 7:
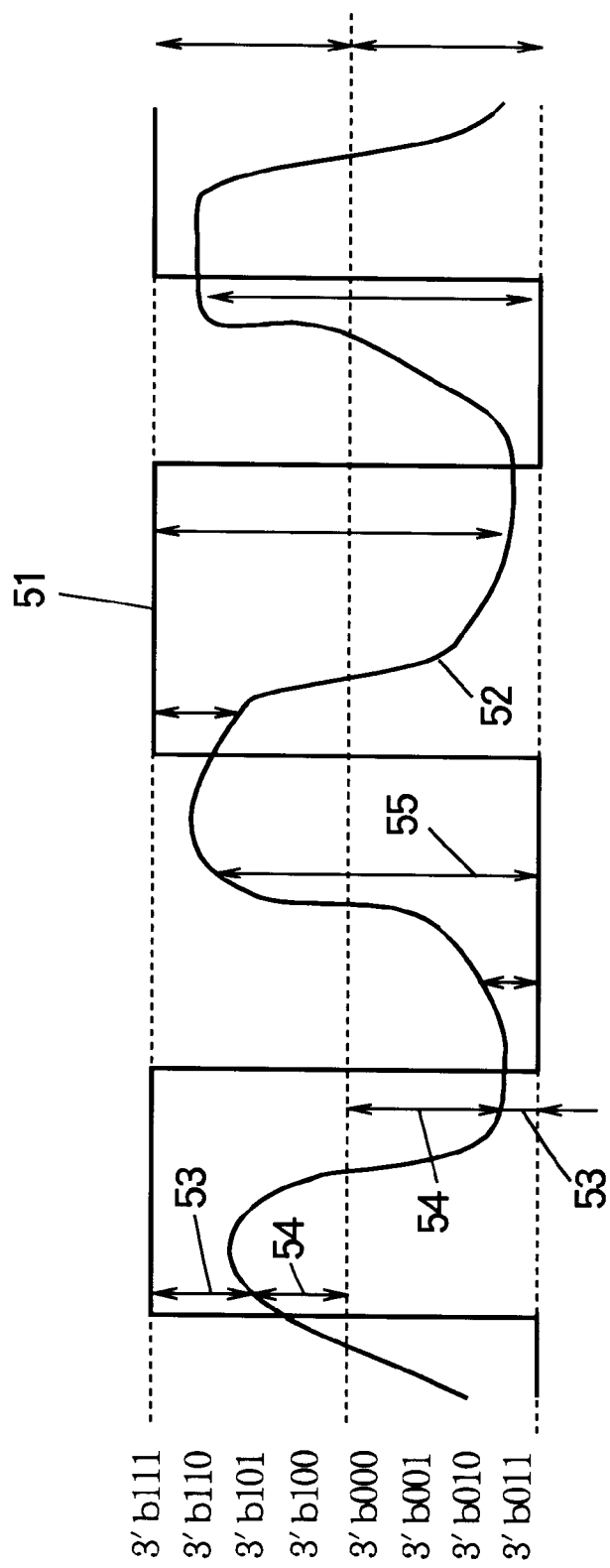
FIG. 7 is a waveform diagram illustrating the operation of the second embodiment.

FIG. 7 indicates the PN code signal waveform 51 and the original waveform 52 of input signal DS, before DS is converted to a digital signal. When converted to digital form, the input signal DS is coded so that the sign bit $b_2$ indicates whether the DS value is higher or lower than the mid-level of the PN code waveform 51. This mid-level is indicated by a dotted line in FIG. 7. The two lower bits $b_1$, $b_0$ of the coded digital input signal DS indicate the absolute value of the amplitude of the DS waveform 52 with respect to this mid-level. A coded DS value of '100', denoted 3'b100 in the drawing, indicates a DS level slightly above the mid-level. A coded value of '000' indicates a DS level slightly below the mid-level. The ideal input DS values are '111', corresponding to a '1' of the PN code, and '011', corresponding to a '0' of the PN code.

In each unit processing circuit 30, when the sign bit $b_2$ of the stored chip data matches the PN code value received from the PN code generator 8, the output of the exclusive-OR gate 34 is low, setting the switch 42 to the lower position in FIG. 6, and the output current obtained from the digital-to-analog converter 36 is complementary to the absolute amplitude indicated by the amplitude bits $b_1$, $b_0$. The output current thus corresponds to the difference 53 between the DS waveform 52 and the PN code waveform 51 in FIG. 7. If the sign bit $b_2$ does not match the PN code value, the output of the exclusive-OR gate 34 is high, setting the switch 42 to the upper position, and the output current is proportional to the absolute amplitude expressed by the amplitude bits $b_1$, $b_0$, plus a value corresponding to the maximum possible amplitude of the input signal DS, generated by the X4 current source. The output current is thus proportional to the amplitude 54 of the DS waveform 52 plus the maximum possible amplitude; that is, to the difference 55 between the DS waveform 52 and the PN code waveform 51.

Accordingly, regardless of whether the sign bit $b_2$ matches or does not match the PN code value, the output current obtained from unit processing circuit 30 is proportional to the absolute value of the difference between the DS waveform 52 and the PN code waveform 51. The operation of the unit processing circuit 30 is summarized in Table 1. The output current values are expressed as multiples of the unit current (X1), using unsigned binary numbers, with the equivalent decimal values given in parentheses.

TABLE 1

| Input data | Output current when sign bit of DS and PN code value | |
|---|---|---|
| DS | match | do not match |
| 111 | 000 (0) | 111 (7) |
| 110 | 001 (1) | 110 (6) |
| 101 | 010 (2) | 101 (5) |
| 100 | 011 (3) | 100 (4) |
| 000 | 011 (3) | 100 (4) |
| 001 | 010 (2) | 101 (5) |
| 010 | 001 (1) | 110 (6) |
| 011 | 000 (0) | 111 (7) |

The current-summing circuits 48 and 12 obtain a total output current proportional to the sum of the absolute differences between the input signal DS and all chips of the PN code. The A/D converter 14 converts this total output current to a digital signal F. As in the first embodiment, F may be a one-bit signal indicating whether the total output current exceeds or does not exceed a threshold value, or a multiple-bit signal indicating the degree of correlation between the input signal DS and the PN code.

Since small values of the total output current indicate a large correlation, the A/D converter 14 may also invert the digital output F, so that a higher value of F indicates a higher correlation.

When the input data signal DS is not synchronized with the PN code, the average value of the current output by the unit processing circuits 30 is substantially halfway between the maximum value (7 in Table 1) and the minimum value (0). When synchronization is achieved, all of the unit processing circuits 30 output the minimum current (0), or currents close to the minimum current (1–3), and the total output current suddenly drops from an intermediate value to a value close to zero, changing the value of the filter output F.

The second embodiment provides advantages similar to those of the first embodiment. Output is obtained in real time, and the digital matching filter circuits can easily be integrated with other digital signal-processing circuits.

Figure 8:
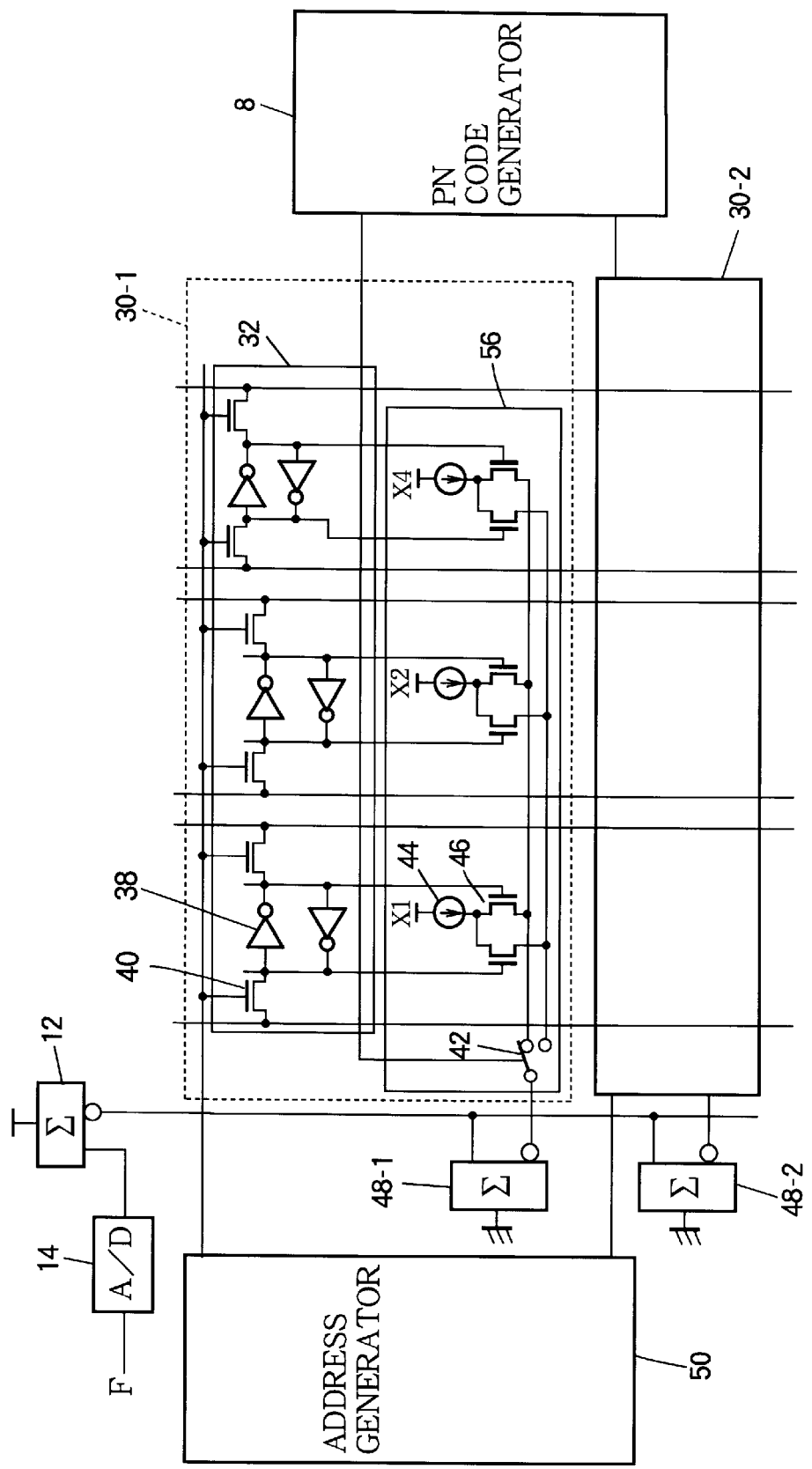
FIG. 8 is a circuit diagram illustrating a variation of the second embodiment.

FIG. 8 illustrates a variation of the second embodiment in which the digital input signal DS is an uncoded, unsigned binary data signal with values ranging from '000' to '111', where '000' corresponds to '0' of the PN code, and '111' corresponds to '1' of the PN code. In this variation, the most significant bit $b_2$ of the input data DS has the same value as the sign bit described above, but the other two bits ($b_1$, $b_0$) code for signal voltage level instead of amplitude. The configuration of the digital-to-analog converter 56 is altered in that the X4 current source is coupled to the switch 42 through a pair of NMOS transistors controlled in a complementary fashion by the most significant bit $b_2$. Also, the switch 42 is controlled directly by the output of the PN code generator 8, being set to the upper position when the PN code value is '0' and to the lower position when the PN code value is '1'.

This variation also produces an output current proportional to the absolute difference between the DS waveform and the PN code waveform. The output current is proportional to the DS signal level when the PN code value is '0', and is complementary to the DS signal level when the PN code value is '1'. The operation of this variation is summarized by Table 2.

TABLE 2

| Input data | Output current when most significant bit of DS data and PN code value | |
|---|---|---|
| DS | match | do not match |
| 111 | 000 (0) | 111 (7) |
| 110 | 001 (1) | 110 (6) |
| 101 | 010 (2) | 101 (5) |
| 100 | 011 (3) | 100 (4) |
| 011 | 011 (3) | 100 (4) |
| 010 | 010 (2) | 101 (5) |
| 001 | 001 (1) | 110 (6) |
| 000 | 000 (0) | 111 (7) |

Many other variations are possible. For example, the input signal DS may be expressed by uncoded, signed binary data, in which case the most significant bit values of the input data DS in Table 2 are reversed, and the connections between the X4 current source and switch 42 in FIG. 8 are reversed in compensation. Two current sources 44 can be provided for each bit of input data, each current source 44 supplying current to a separate transistor 46. A switching transistor can be provided for the X4 current source in FIG. 6. Once the memory circuits 32 in all of the unit processing circuits 30 have been loaded with chip data, the chip data can be left unchanged while the PN code is shifted until synchronization is recognized. In this case, the number of unit processing circuits 30 can be less than the number of chips in the PN code. Alternatively, the input data DS can be stored in D-type flip-flops as in the first embodiment, the flip-flops forming a separate shift register for each bit $b_2$, $b_1$, $b_0$, in which case the PN code generator 8 operates statically as in the first embodiment.

Next, a third embodiment will be described. In the third embodiment, as in the first embodiment, the input signal DS has only one bit per chip.

Figure 9:
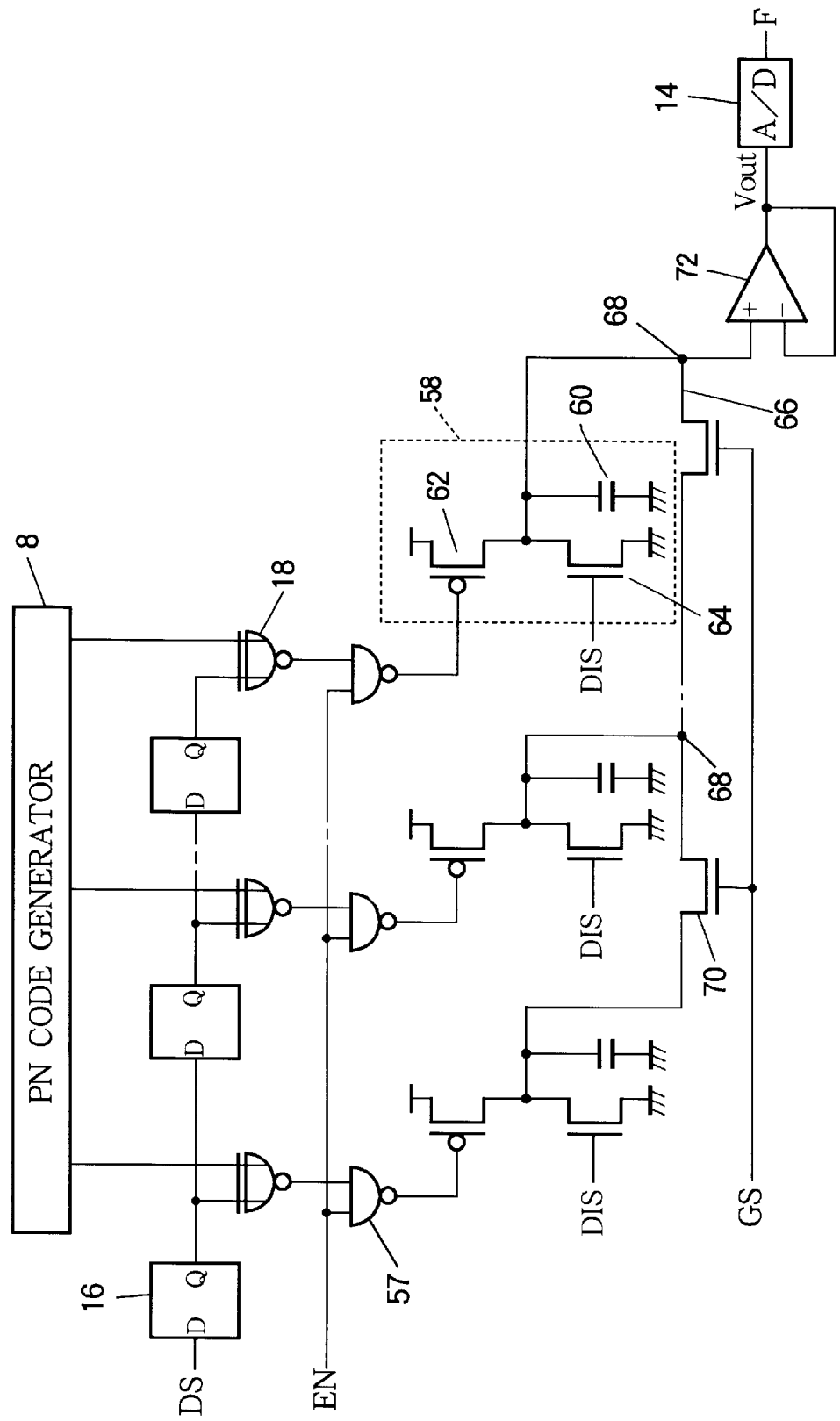
FIG. 9 is a circuit diagram illustrating a third embodiment of the invention.

Referring to FIG. 9, the third embodiment employs the same PN code generator 8, D-type flip-flops 16, and exclusive-NOR gates 18 as in the first embodiment. The output terminals of the exclusive-NOR gates 18 are coupled to respective NAND gates 57, which also receive an enable signal EN from a control circuit (not visible).

The signals output by the NAND gates 57 are supplied to respective digital-to-analog converters 58, each having a capacitor 60, a p-channel metal-oxide-semiconductor (PMOS) transistor 62 for charging the capacitor 60, and an NMOS transistor 64 for discharging the capacitor 60. The gate terminal of the PMOS transistor 62 receives the output of the NAND gate 57. The source terminal of the PMOS transistor 62 is coupled to a power supply, indicated by a short horizontal line in the drawing. The gate terminal of the NMOS transistor 64 receives a discharge signal DIS from the control circuit. The source terminal of the NMOS transistor 64 is coupled to ground. One terminal of the capacitor 60 is coupled to ground. The other terminal of the capacitor 60 is coupled to the drain terminals of the PMOS transistor 62 and NMOS transistor 64, and to the output signal line of the digital-to-analog converter 58.

The output signal lines of the digital-to-analog converters 58 are coupled to a common signal line 66 at nodes 68 that are mutually separated by gate transistors 70. The gate terminals of the gate transistors 70 receive a common gate signal GS from the control circuit. The source and drain terminals of the gate transistors 70 are coupled to the common signal line 66, forming a switchable interconnecting circuit. The common signal line 66 terminates at the non-inverting (+) input terminal of an operational amplifier 72. The inverting (−) input terminal of the operational amplifier 72 is coupled to the output terminal of the operational amplifier 72, causing the operational amplifier 72 to operate as a voltage follower. The output terminal of the operational amplifier 72 is coupled to the input terminal of an A/D converter 14 of the type described in the first embodiment.

Next, the operation of the third embodiment will be described.

In synchronization with the arrival of each new chip of the input signal DS, the control circuit drives the enable signal EN and gate signal GS to the low level and the discharge signal DIS to the high level, thereby switching the PMOS transistors 62 off and the NMOS transistors 64 on and discharging the capacitor 60 in each digital-to-analog converter 58. Next, the control circuit drives the discharge signal DIS to the low level and the enable signal EN to the high level, switching off the NMOS transistors 64 and switching on the PMOS transistors 62 corresponding to chips in which the DS signal value matches the PN code value. The capacitors 60 corresponding to these matching chips are thereby charged to the power-supply voltage level, other capacitors 60 remaining in the discharged state.

If M is the number of chips in which the DS and PN values match, VDD is the power-supply voltage, and C is the capacitance of each of the capacitors 60, the total charge Q stored in the capacitors 60 is given by the following equation.

$$Q = M \times VDD \times C$$

Next, the control circuit drives the enable signal EN to the low level and the gate signal GS to the high level. The charge stored in the above M capacitors 60 is thereby shared among all of the capacitors 60. The operational amplifier 72 receives an input voltage corresponding to the shared charge, and generates an identical output voltage Vout. If the total number of capacitors 60 is N, the output voltage Vout is given by the following equation.

$$Vout = M \times VDD \times C / (N \times C) = M \times VDD / N$$

The output voltage Vout thus corresponds to the average charge stored in each capacitor 60. This output voltage Vout is converted to a digital output signal F by the A/D converter 14.

When the input signal DS is synchronized with the PN code, M is equal to N, and the output voltage Vout is equal to the power-supply potential VDD. When the input signal DS is not synchronized with the PN code, M is substantially equal to one-half N, and the output voltage Vout is substantially equal to VDD/2.

The third embodiment provides substantially the same advantages as the first embodiment. The circuits in FIG. 9 can easily be integrated with other digital signal-processing circuits, and the charges stored in the capacitors 60 are summed in an analog fashion with substantially no processing delay.

Figure 10:
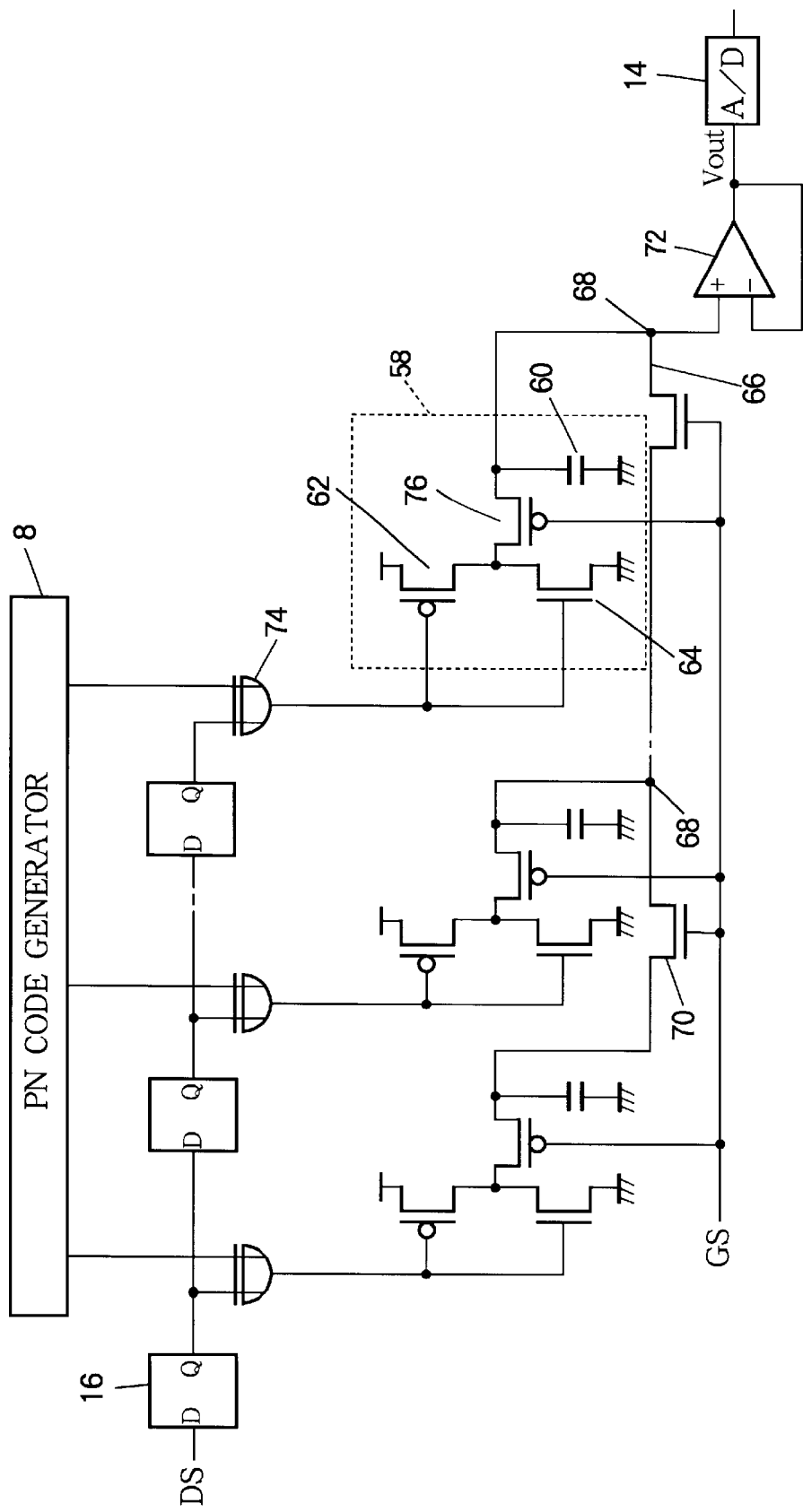
FIG. 10 is a circuit diagram illustrating a variation of the third embodiment.

FIG. 10 illustrates a variation of the third embodiment that employs exclusive-OR gates 74 instead of exclusive-NOR gates to compare the input signal DS with the PN code. The output terminals of the exclusive-OR gates 74 are coupled to the gate terminals of both the PMOS transistors 62 and the NMOS transistors 64 in the digital-to-analog converters 58. The drain terminals of the PMOS transistor 62 and NMOS transistor 64 are coupled to the capacitor 60 through an additional PMOS transistor 76, the gate terminal of which receives the gate signal GS from the control circuit. When each new chip of the input signal DS is received, the gate signal GS is first driven low to charge and discharge the capacitors 60, then driven high to supply the operational amplifier 72 with a voltage input signal corresponding to the total charge stored in the capacitors 60, proportional to the number of chips in which the DS input value and PN code value match.

This variation operates in the same way as the circuit in FIG. 9, but does not require the control circuit to supply an enable signal or a discharge signal.

In a further variation, the PMOS transistors 62 and NMOS transistors 64 are eliminated, and the capacitors 60 are charged or discharged directly by the outputs of the exclusive-OR gates 74, the output voltage Vout thus going to the ground level when synchronization is achieved. If desired, the exclusive-OR gates 74 may be replaced with exclusive-NOR gates 18 to make the voltage output signal Vout go to VDD when synchronization is achieved.

Next, a fourth embodiment will be described. The fourth embodiment is similar to the variation of the third embodiment shown in FIG. 10, but the digital input signal DS has multiple bits, as in the second embodiment, and is coded as shown in FIG. 7.

Figure 11:
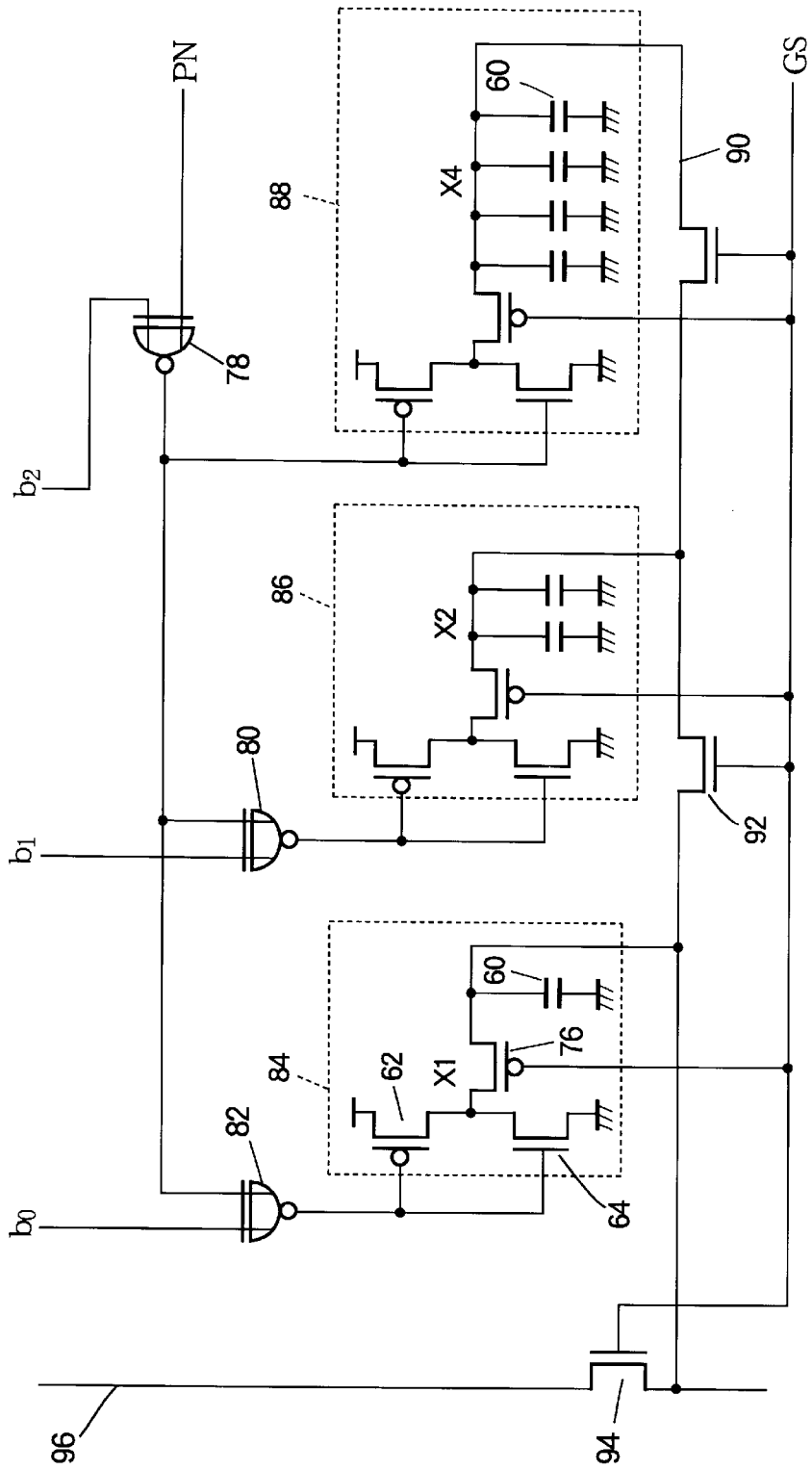
FIG. 11 is a circuit diagram illustrating a fourth embodiment of the invention.

FIG. 11 shows the unit processing circuit that compares one chip of the digital input signal DS with one chip value of the PN code and converts the result to an analog signal. The sign bit $b_2$ of the input signal DS and the PN code value are supplied to an exclusive-NOR gate 78. The output terminal of this exclusive-NOR gate 78 is coupled to input terminals of two exclusive-NOR gates 80, 82 which receive bits $b_1$ and $b_0$, respectively, of the input data signal DS.

The output terminal of exclusive-NOR gate 82 is coupled to a digital-to-analog converter 84 having PMOS transistors 62, 76, an NMOS transistor 64, and a capacitor 60 coupled in the same configuration as in FIG. 10. The output terminal of exclusive-NOR gate 80 is coupled to a similar digital-to-analog converter 86 having two capacitors instead of one. The output terminal of exclusive-NOR gate 78 is coupled to a similar digital-to-analog converter 88 having four capacitors 60. All seven capacitors 60 in FIG. 11 have identical capacitance values.

The output signal lines of the digital-to-analog converters 84, 86, 88 are coupled to a common signal line 90 at nodes separated by gate transistors 92. This common signal line 90 is coupled to the source terminal of a further gate transistor 94. The gate terminals of gate transistors 92, 94 receive a gate signal GS from a control circuit (not visible)

The fourth embodiment has N unit processing circuits of the type shown in FIG. 11, where N is equal to or less than the number of chips in one complete cycle of the PN code. These N unit processing circuits are linked together by a signal line 96, which connects gate transistors 94 in series. This signal line 96 is coupled to the input terminal of an operational amplifier (not visible) operating as a voltage follower to generate a voltage output signal Vout for input to an analog-to-digital converter (not visible).

The input signal DS may be stored in static memory circuits of the type shown in the second embodiment, or in shift registers comprising D-type flip-flops, as in the third embodiment.

When the control circuit drives the gate signal GS to the low level, the capacitors 60 in FIG. 11 are charged or discharged, depending on the bit values $b_2$, $b_1$, $b_0$ of the input data signal DS, and depending on whether the sign bit $b_2$ matches the PN code value. The charge stored in the digital-to-analog converter 84, 86, 88 is weighted in the same way that the current sources in the second embodiment were weighted, as indicated by the symbols X1, X2, X4 in the drawing.

If, for a certain chip, the DS signal value is '111' and the PN code value is '1', then all three exclusive-NOR gates 78, 80, 82 have high outputs, all three NMOS transistors 64 turn on, all capacitors 60 are discharged, and the total charge stored in the three digital-to-analog converters 84, 86, 88 is zero. If the DS signal value is '111' and the PN code value is '0', then exclusive-NOR gates 78, 80, 82 have low outputs, the PMOS transistors 62 turn on, all capacitors 60 are charged, digital-to-analog converter 84 stores one unit of charge, digital-to-analog converter 86 stores two units of charge, and digital-to-analog converter 88 stores four units of charge, making a total of seven units of charge. These operations correspond to the top row in Table 1.

The circuit in FIG. 11 also operates as in Table 1 for other combinations of DS values and PN code values, yielding an analog comparison result signal corresponding to the absolute difference between the DS value and the PN code value. When the sign bit ($b_2$) matches the PN code value, exclusive-NOR gate 78 discharges the group of four capacitors 60 in digital-to-analog converter 88, and the other two exclusive-NOR gates 80, 82 store a charge representing the complement of the amplitude of the digital input signal DS in the group of three capacitors 60 in digital-to-analog converters 84, 86. When the sign bit ($b_2$) and PN code value do not match, exclusive-NOR gate 78 stores a charge representing the maximum possible amplitude of the digital input signal DS in the group of capacitors 60 in digital-to-analog converter 88, and exclusive-NOR gates 80, 82 store a charge representing the amplitude of the digital input signal DS in the group of capacitors 60 in digital-to-analog converters 84, 86.

When the control circuit drives the gates signal GS to the high level, the charges stored for each chip are summed and averaged in the same way as in the third embodiment, generating an output voltage indicating the degree of correlation between the input signal DS and the PN code.

The fourth embodiment provides the same advantages as the embodiments described above, being readily integrated with other digital signal-processing circuits, and providing an output signal in real time.

If the input signal DS is not coded as shown in FIG. 7, the logic circuits providing input signals to the digital-to-analog converters 84, 86, 88 can be modified so that the output analog signal still corresponds to the absolute difference between the input signal DS and the PN code. Various other modifications can be made to the circuit configuration shown in FIG. 11.

As described above, the present invention provides a digital matched filter with speed comparable to that of a discrete analog device such as a CCD or SAW device. When used in a CDMA receiver, the invention enables the size and cost of the receiver to be reduced with no sacrifice of performance.

The second and fourth embodiments are not limited to a three-bit input signal DS. The input signal DS may have any bit width greater than one bit.

The connections in the digital-to-analog converters in the second and fourth embodiments can be modified so that the analog comparison results signals are complementary to the absolute difference between the DS signal waveform and the PN code waveform, thus increasing as the correlation between the input signal DS and the PN code increases.

Those skilled in the art will recognize that further variations are possible within the scope claimed below.

What is claimed is:

1. A method of correlating a digital input signal with a known code, comprising the steps of:
    (a) storing a series of values of the digital input signal in a memory;
    (b) comparing each stored value of the digital input signal with a corresponding value of the known code;
    (c) generating respective analog comparison result signals for all said stored values simultaneously and switching a plurality of current sources on and off according to comparison results obtained in said step (b);
    (d) combining the analog comparison result signals to obtain an analog sum signal, wherein the analog comparison result signals are current signals; and
    (e) converting the analog sum signal to a digital output signal.

2. The method of claim 1, wherein said step (d) further comprises the step of supplying currents from the current sources in parallel to a current mirror circuit.

3. A method of correlating a digital input signal with a known code, comprising the steps of:
    (a) storing a series of values of the digital input signal in a memory
    (b) comparing each stored value of the digital input signal with a corresponding value of the known code;
    (c) generating respective analog comparison result signals for all said stored values simultaneously;
    (d) combining the analog comparison result signals to obtain an analog sum signal, wherein the analog comparison result signals are voltage signals represented by charges stored in a plurality of capacitors; and
    (e) converting the analog sum signal to a digital output signal.

4. The method of claim 3, wherein said step (c) further comprises the steps of:
    dividing the plurality of capacitors into a first group and a second group according to comparison results obtained in said step (b);
    charging the capacitors in the first group to a first potential; and
    discharging the capacitors in the second group to a second potential.

5. The method of claim 4, wherein said step (d) further comprises the step of interconnecting the plurality of capacitors, thereby obtaining, as the analog sum signal, a voltage signal proportional to a total charge stored in the plurality of capacitors.

6. A method of correlating a digital input signal with a known code, comprising the steps of:
    (a) storing a series of values of the digital input signal in a memory;
    (b) comparing each stored value of the digital input signal with a corresponding value of the known code;
    (c) generating respective analog comparison result signals for all said stored values simultaneously;
    (d) combining the analog comparison result signals to obtain an analog sum signal, wherein each analog comparison result signal among the analog comparison result signals is a multi-level signal representing a difference between one the stored value of the digital input signal and the corresponding value of the known code; and (e) converting the analog sum signal to a digital output signal.

7. The method of claim 6, wherein each said stored value has assign bit, and for each said stored value, said step (c) further comprises the steps of:

generating a first analog signal proportional to a sum of an absolute amplitude of said stored value and a maximum possible amplitude of the digital input signal;

generating a second analog signal proportional to a difference between said absolute amplitude and said maximum possible amplitude; and selecting one of the first analog signal and the second analog signal, depending on agreement of the sign bit of said stored value with the corresponding value of the known code.

8. A digital matched filter for comparing a digital input signal with a known code, comprising:

a code generator generating the known code;

a plurality of unit processing circuits coupled to the code generator, storing respective values of the digital input signal, comparing the stored values with corresponding values of the known code, and generating respective current signals indicating comparison results;

a current summing circuit coupled to the plurality of unit processing circuits, summing said current signals to obtain an output current signal; and an analog-to-digital converter coupled to the current summing circuit, converting the output current signal to a digital output signal;

wherein each one of the unit processing circuits separately comprises:

a memory circuit storing one bit of the digital input signal;

a logic gate performing an exclusive logical operation on said one bit of the digital input signal and a corresponding bit of the known code; and a digital-to-analog converter converting an output of the logic gate to one of said current signals.

9. The digital matched filter of claim 8, wherein the digital-to-analog converter comprises:

a current source; and a transistor coupled to the current source, switched on and off by the output of said logic gate.

10. A digital matched filter for comparing a digital input signal with a known code, comprising:

a code generator generating the known code;

a plurality of unit processing circuits coupled to the code generator, storing respective values of the digital input signal, comparing the stored values with corresponding values of the known code, and generating respective current signals indicating comparison results;

a current summing circuit coupled to the plurality of unit processing circuits, summing said current signals to obtain an output current signal; and an analog-to-digital converter coupled to the current summing circuit, converting the output current signal to a digital output signal;

wherein each one of the unit processing circuits separately comprises:

a memory circuit storing one value of the digital input signal; and a digital-to-analog converter generating, as one of said current signals, a current representing a difference between the value stored in the memory circuit and a corresponding value of the known code.

11. The digital matched filter of claim 10, wherein:

said one value of the digital input signal has a sign bit representing a sign of the digital input signal, and at least one amplitude bit representing an amplitude of the digital input signal;

said one of the unit processing circuits also has a logic gate performing an exclusive logical operation on said sign bit and the corresponding value of the known code; and the digital-to-analog converter generates a first current representing a difference between the amplitude of the digital input signal and a maximum possible amplitude of the digital input signal, and a second current representing a sum of the amplitude of the digital input signal and said maximum possible amplitude, and has a switch, controlled by an output of said logic gate, for selecting one of the first current and the second current.

12. A digital matched filter for comparing a digital input signal with a known code, comprising:

a code generator generating the known code;

a memory circuit storing a plurality of values of the digital input signal;

a plurality of capacitors;

a plurality of logic circuits coupled to the code generator, the memory circuit, and respective capacitors, comparing respective values of the digital input signal with corresponding values of the known code, thereby obtaining comparison results, and charging and discharging the capacitors according to the comparison results;

an interconnecting circuit switchably interconnecting the capacitors, thereby obtaining an analog voltage signal representing a total charge stored in the capacitors; and an analog-to-digital converter coupled to the interconnecting circuit, converting the analog voltage signal to a digital output signal.

13. The digital matched filter of claim 12, wherein each one of said logic circuits separately comprises:

a first transistor for discharging one of the capacitors;

a logic gate performing an exclusive logical operation on one bit of the digital input signal and a corresponding bit of the known code; and a second transistor for charging one of the capacitors, responsive to an output of the logic gate.

14. The digital matched filter of claims 12, wherein each one of said logic circuits is coupled to more than one of the capacitors and stores, in the coupled ones of the capacitors, a total charge representing a difference between one value of the digital input signal stored in the memory circuit and one corresponding value of the known code.

15. The digital matched filter of claim 14, wherein:

said one value of the digital input signal has a sign bit representing a sign of the digital input signal, and at least one amplitude bit representing an amplitude of the digital input signal, and each one of said logic circuits comprises:

a first logic gate performing an exclusive logical operation on the sign bit and the corresponding value of the known code, storing a charge representing a maximum possible amplitude of the digital input signal in a first group of the capacitors, conditional on agreement of the sign bit with the corresponding value of the known code; and at least one second logic gate performing an exclusive logic operation on said amplitude bit and an output of the first logic gate, storing in a second group of the capacitors a charge representing the amplitude of the digital input signal if the output of the first logic gate has one value, and a complement of the amplitude of the digital input signal if the output of the first logic gate has another value.

16. The digital matched filter of claim 12, wherein the digital input signal is a code division multiple access signal.

17. The digital matched filter of claim 12, wherein the known code is a pseudorandom noise code.

* * * * *